United States Patent
Eryurek et al.

(10) Patent No.: US 6,434,504 B1
(45) Date of Patent: Aug. 13, 2002

(54) RESISTANCE BASED PROCESS CONTROL DEVICE DIAGNOSTICS

(75) Inventors: Evren Eryurek, Minneapolis; Steven R. Esboldt, Eagan; Gregory H. Rome, Fridley, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/369,530

(22) Filed: Aug. 6, 1999

Related U.S. Application Data

(63) Continuation-in-part of application No. 09/138,446, filed on Aug. 21, 1998, which is a continuation-in-part of application No. 09/016,216, filed on Jan. 30, 1998, which is a continuation-in-part of application No. 08/744,980, filed on Nov. 7, 1996, now Pat. No. 5,828,567.

(51) Int. Cl.$^7$ .............................................. G01K 17/06
(52) U.S. Cl. ...................................... 702/130; 374/187
(58) Field of Search .............................. 702/47, 53, 85, 702/86, 99, 104, 116, 58, 59, 130; 374/15, 46, 101–103, 113–114, 132, 133, 163, 179, 180, 183, 185, 187; 338/2, 3, 9, 13

(56) References Cited

U.S. PATENT DOCUMENTS

| | | | |
|---|---|---|---|
| 3,096,434 A | 7/1963 | King ........................ | 235/151 |
| 3,404,264 A | 10/1968 | Kugler ...................... | 235/194 |
| 3,468,164 A | 9/1969 | Sutherland ................. | 73/343 |
| 3,590,370 A | 6/1971 | Fleischer .................. | 324/51 |

(List continued on next page.)

FOREIGN PATENT DOCUMENTS

| | | |
|---|---|---|
| DE | 32 13 866 A1 | 10/1983 |
| DE | 35 40 204 C1 | 9/1986 |

(List continued on next page.)

OTHER PUBLICATIONS

"Improving Dynamic Performance of Temperature Sensors With Fuzzy Control Techniques," by Wang Lei et al., pp. 872–873 (1992).

"Microsoft Press Computer Dictionary" 2nd Edition, 1994, Microsoft Press. p. 156.

U.S. application No. 09/855,179, Eryurek et al., filed May 14, 2001.

U.S. application No. 09/852,102, Eryurek et al., filed May 9, 2001.

U.S. application No. 09/576,719, Coursolle et al., filed May 23, 2000.

U.S. application No. 09/799,824, Rome et al., filed Mar. 5, 2001.

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Acuators, pp. 115–119 (1991).

(List continued on next page.)

*Primary Examiner*—Marc S. Hoff
*Assistant Examiner*—Edward Raymond
(74) *Attorney, Agent, or Firm*—Westman, Champlin & Kelly, P.A.

(57) ABSTRACT

A device in a process control system includes an electrical element which has a resistance. Self-heating circuitry coupled to the element provides a self-heating current to determine the self-heating index (SHI) of the element. Diagnostic information about the electrical element is provided based upon the self-heating index.

37 Claims, 6 Drawing Sheets

U.S. PATENT DOCUMENTS

| | | | |
|---|---|---|---|
| 3,688,190 A | 8/1972 | Blum .................... 324/61 R |
| 3,691,842 A | 9/1972 | Akeley .................... 73/398 C |
| 3,701,280 A | 10/1972 | Stroman .................... 73/194 |
| 3,973,184 A | 8/1976 | Raber .................... 324/51 |
| RE29,383 E | 9/1977 | Gallatin et al. ............... 137/14 |
| 4,058,975 A | 11/1977 | Gilbert et al. ............. 60/39.28 |
| 4,099,413 A | 7/1978 | Ohte et al. .................... 73/359 |
| 4,102,199 A | 7/1978 | Talpouras .................... 73/362 |
| 4,122,719 A | 10/1978 | Carlson et al. ............... 73/342 |
| 4,249,164 A | 2/1981 | Tivy .................... 340/870.3 |
| 4,250,490 A | 2/1981 | Dahlke .................... 340/870.37 |
| 4,337,516 A | 6/1982 | Murphy et al. ............. 364/551 |
| 4,399,824 A | 8/1983 | Davidson .................... 128/736 |
| 4,517,468 A | 5/1985 | Kemper et al. ............... 290/52 |
| 4,528,869 A * | 7/1985 | Ekstrom, Jr. ................. 219/535 |
| 4,530,234 A | 7/1985 | Cullick et al. .................... 73/53 |
| 4,571,689 A | 2/1986 | Hildebrand et al. ........ 364/481 |
| 4,635,214 A | 1/1987 | Kasai et al. ............... 364/551 |
| 4,642,782 A | 2/1987 | Mathur et al. ................. 706/25 |
| 4,644,479 A | 2/1987 | Kemper et al. ............. 364/550 |
| 4,649,515 A | 3/1987 | Thompson et al. ......... 364/900 |
| 4,707,796 A | 11/1987 | Calabro et al. ............. 364/552 |
| 4,736,367 A | 4/1988 | Wroblewski et al. ......... 370/85 |
| 4,777,585 A | 10/1988 | Kokawa et al. ............. 364/164 |
| 4,807,151 A * | 2/1989 | Citron .................... 702/47 |
| 4,831,564 A | 5/1989 | Suga .................... 364/551.01 |
| 4,841,286 A | 6/1989 | Kummer .................... 340/653 |
| 4,873,655 A | 10/1989 | Kondraske .................... 364/553 |
| 4,907,167 A | 3/1990 | Skeirik .................... 364/500 |
| 4,924,418 A | 5/1990 | Backman et al. ........... 364/550 |
| 4,934,196 A | 6/1990 | Romano .................... 73/861.38 |
| 4,939,753 A | 7/1990 | Olson .................... 375/107 |
| 4,964,125 A | 10/1990 | Kim .................... 371/15.1 |
| 4,988,990 A | 1/1991 | Warrior .................... 340/25.5 |
| 4,992,965 A | 2/1991 | Holter et al. ........... 364/551.01 |
| 5,005,142 A | 4/1991 | Lipchak et al. ............. 364/550 |
| 5,019,760 A * | 5/1991 | Chu et al. .................... 318/490 |
| 5,043,862 A | 8/1991 | Takahashi et al. .......... 364/162 |
| 5,053,815 A | 10/1991 | Wendell .................... 355/208 |
| 5,067,099 A | 11/1991 | McCown et al. ........... 364/550 |
| 5,081,598 A | 1/1992 | Bellows et al. ............. 364/550 |
| 5,089,984 A | 2/1992 | Struger et al. .............. 395/650 |
| 5,098,197 A | 3/1992 | Shepard et al. ............. 374/120 |
| 5,099,436 A | 3/1992 | McCown et al. ........... 364/550 |
| 5,103,409 A | 4/1992 | Shimizu et al. ............. 364/556 |
| 5,111,531 A | 5/1992 | Grayson et al. ............... 395/23 |
| 5,121,467 A | 6/1992 | Skeirik .................... 395/11 |
| 5,122,794 A | 6/1992 | Warrior .................... 340/825.2 |
| 5,122,976 A | 6/1992 | Bellows et al. ............. 364/550 |
| 5,130,936 A | 7/1992 | Sheppard et al. ......... 364/551.01 |
| 5,134,574 A | 7/1992 | Beaverstock et al. .. 364/551.01 |
| 5,137,370 A | 8/1992 | McCullock et al. ........ 374/173 |
| 5,142,612 A | 8/1992 | Skeirik .................... 395/11 |
| 5,143,452 A | 9/1992 | Maxedon et al. ............. 374/170 |
| 5,148,378 A | 9/1992 | Shibayama et al. .... 364/551.07 |
| 5,167,009 A | 11/1992 | Skeirik .................... 395/27 |
| 5,175,678 A | 12/1992 | Frerichs et al. ............. 364/148 |
| 5,193,143 A | 3/1993 | Kaemmerer et al. ........... 395/51 |
| 5,197,114 A | 3/1993 | Skeirik .................... 395/22 |
| 5,197,328 A | 3/1993 | Fitzgerald .................... 73/168 |
| 5,212,765 A | 5/1993 | Skeirik .................... 395/22 |
| 5,214,582 A | 5/1993 | Gray .................... 364/424.03 |
| 5,224,203 A | 6/1993 | Skeirik .................... 395/11 |
| 5,228,780 A | 7/1993 | Shepard et al. ............. 374/175 |
| 5,235,527 A | 8/1993 | Ogawa et al. ........ 364/571.05 |
| 5,265,031 A | 11/1993 | Malczewski .................... 364/497 |
| 5,265,222 A | 11/1993 | Nishiya et al. ................. 395/3 |
| 5,269,311 A | 12/1993 | Kirchner et al. ............. 128/672 |
| 5,274,572 A | 12/1993 | O'Neill et al. ............. 364/550 |
| 5,282,131 A | 1/1994 | Rudd et al. ................. 364/164 |
| 5,282,261 A | 1/1994 | Skeirik .................... 395/22 |
| 5,293,585 A | 3/1994 | Morita .................... 395/52 |
| 5,303,181 A | 4/1994 | Stockton .................... 365/96 |
| 5,305,230 A | 4/1994 | Matsumoto et al. ........ 364/495 |
| 5,311,421 A | 5/1994 | Nomura et al. ............. 364/157 |
| 5,317,520 A | 5/1994 | Castle .................... 364/482 |
| 5,327,357 A | 7/1994 | Feinstein et al. ............ 364/502 |
| 5,333,240 A | 7/1994 | Matsumoto et al. .......... 395/23 |
| 5,347,843 A | 9/1994 | Orr et al. .................... 73/3 |
| 5,349,541 A | 9/1994 | Alexandro, Jr. et al. ..... 364/578 |
| 5,357,449 A | 10/1994 | Oh .................... 364/551.01 |
| 5,361,628 A | 11/1994 | Marko et al. ................. 73/116 |
| 5,365,423 A | 11/1994 | Chand .................... 364/140 |
| 5,367,612 A | 11/1994 | Bozich et al. ................. 395/22 |
| 5,384,699 A | 1/1995 | Levy et al. ............. 364/413.13 |
| 5,386,373 A | 1/1995 | Keeler et al. ................. 364/577 |
| 5,394,341 A | 2/1995 | Kepner .................... 364/551.01 |
| 5,394,543 A | 2/1995 | Hill et al. .................... 395/575 |
| 5,404,064 A | 4/1995 | Mermelstein et al. ....... 310/319 |
| 5,408,406 A * | 4/1995 | Mathur et al .................. 700/45 |
| 5,408,586 A | 4/1995 | Skeirik .................... 395/23 |
| 5,414,645 A | 5/1995 | Hirano .................... 364/551.01 |
| 5,419,197 A | 5/1995 | Ogi et al. .................... 73/659 |
| 5,430,642 A * | 7/1995 | Nakajima et al ............... 700/50 |
| 5,440,478 A | 8/1995 | Fisher et al. ................. 364/188 |
| 5,442,639 A | 8/1995 | Crowder et al. ........... 371/20.1 |
| 5,467,355 A | 11/1995 | Umeda et al. .......... 364/571.04 |
| 5,469,156 A | 11/1995 | Kogura .................... 340/870.38 |
| 5,469,735 A | 11/1995 | Watanabe .................... 73/118.1 |
| 5,469,749 A | 11/1995 | Shimado et al. .......... 73/861.47 |
| 5,481,199 A | 1/1996 | Anderson et al. ............ 324/705 |
| 5,483,387 A | 1/1996 | Bauhahn et al. ............. 359/885 |
| 5,485,753 A | 1/1996 | Burns et al. .................... 73/720 |
| 5,486,996 A | 1/1996 | Samad et al. ................. 364/152 |
| 5,488,697 A | 1/1996 | Kaemmerer et al. ........... 395/51 |
| 5,489,831 A | 2/1996 | Harris .................... 318/701 |
| 5,495,769 A | 3/1996 | Borden et al. ................. 73/718 |
| 5,510,779 A | 4/1996 | Maltby et al. ............. 340/870.3 |
| 5,511,004 A | 4/1996 | Dubost et al. .......... 364/551.01 |
| 5,548,528 A | 8/1996 | Keeler et al. ................. 364/497 |
| 5,561,599 A | 10/1996 | Lu .................... 364/164 |
| 5,570,300 A | 10/1996 | Henry et al. ........... 364/551.01 |
| 5,572,420 A | 11/1996 | Lu .................... 364/153 |
| 5,573,032 A | 11/1996 | Lenz et al. .................... 137/486 |
| 5,598,521 A | 1/1997 | Kilgore et al. ............. 395/326 |
| 5,600,148 A | 2/1997 | Cole et al. ............... 250/495.1 |
| 5,623,605 A | 4/1997 | Keshav et al. ........ 395/200.17 |
| 5,637,802 A | 6/1997 | Frick et al. .................... 73/724 |
| 5,640,491 A | 6/1997 | Bhat et al. .................... 395/22 |
| 5,661,668 A | 8/1997 | Yemini et al. ............. 364/550 |
| 5,665,899 A | 9/1997 | Willcox .................... 73/1.63 |
| 5,669,713 A | 9/1997 | Schwartz et al. ............... 374/1 |
| 5,671,335 A | 9/1997 | Davis et al. .................... 395/23 |
| 5,675,504 A | 10/1997 | Serodes et al. ............. 364/496 |
| 5,675,724 A | 10/1997 | Beal et al. ............. 395/182.02 |
| 5,680,109 A | 10/1997 | Lowe et al. .................... 340/608 |
| 5,700,090 A | 12/1997 | Eryurek .................... 374/210 |
| 5,703,575 A | 12/1997 | Kirpatrick ............. 340/870.17 |
| 5,704,011 A | 12/1997 | Hansen et al. ................. 395/22 |
| 5,705,978 A | 1/1998 | Frick et al. .................... 340/511 |
| 5,708,585 A * | 1/1998 | Kushion .................... 701/108 |
| 5,713,668 A | 2/1998 | Lunghofer et al. .......... 374/179 |
| 5,719,378 A | 2/1998 | Jackson, Jr. et al. ........ 219/497 |
| 5,741,074 A | 4/1998 | Wang et al. .................... 374/185 |
| 5,742,845 A | 4/1998 | Wagner .................... 395/831 |
| 5,746,511 A | 5/1998 | Eryurek et al. ................. 374/2 |
| 5,752,008 A | 5/1998 | Bowling .................... 395/500 |
| 5,764,891 A | 6/1998 | Warrior .................... 395/200.2 |
| 5,781,878 A | 7/1998 | Mizoguchi et al. ......... 701/109 |
| 5,801,689 A | 9/1998 | Huntsman .................... 345/329 |
| 5,805,442 A | 9/1998 | Crater et al. ................. 364/138 |
| 5,828,567 A | 10/1998 | Eryurek et al. ................. 700/79 |
| 5,829,876 A | 11/1998 | Schwartz et al. ............... 374/1 |
| 5,848,383 A | 12/1998 | Yuuns .................... 702/102 |
| 5,859,964 A | 1/1999 | Wang et al. ........... 395/185.01 |
| 5,876,122 A | 3/1999 | Eryurek .................... 374/183 |
| 5,880,376 A | 3/1999 | Sai et al. ................. 73/861.08 |
| 5,887,978 A | 3/1999 | Lunghofer et al. .......... 374/179 |
| 5,923,557 A | 7/1999 | Eidson .................... 364/471.03 |
| 5,924,086 A | 7/1999 | Mathur et al. ................. 706/25 |

| | | | |
|---|---|---|---|
| 5,926,778 A | 7/1999 | Pöppel | 702/130 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 6,016,706 A | 1/2000 | Yamamoto et al. | 9/6 |
| 6,017,143 A | 1/2000 | Eryurek et al. | 700/51 |
| 6,038,579 A | 3/2000 | Sekine | 708/400 |
| 6,045,260 A | 4/2000 | Schwartz et al. | 374/183 |
| 6,047,220 A | 4/2000 | Eryurek et al. | 700/28 |
| 6,047,222 A | 4/2000 | Burns et al. | 700/49 |
| 6,119,047 A | 9/2000 | Eryurek et al. | 700/28 |
| 6,151,560 A * | 10/2000 | Jones | 702/58 |
| 6,192,281 B1 | 2/2001 | Brown et al. | 700/2 |
| 6,195,591 B1 | 2/2001 | Nixon et al. | 700/83 |
| 6,199,018 B1 | 3/2001 | Quist et al. | 702/34 |
| 6,263,487 B1 | 7/2001 | Stripf et al. | 717/1 |
| 6,298,377 B1 | 10/2001 | Hartikainen et al. | 709/223 |

FOREIGN PATENT DOCUMENTS

| | | |
|---|---|---|
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 594 227 A1 | 4/1994 |
| EP | 0 624 847 A1 | 11/1994 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 62-30915 | 2/1987 |
| JP | 64-1914 | 1/1989 |
| JP | 64-72699 | 3/1989 |
| JP | 2-5105 | 1/1990 |
| JP | 5-122768 | 5/1993 |
| JP | 6242192 | 9/1994 |
| JP | 7-63586 | 3/1995 |
| JP | 7234988 | 9/1995 |
| JP | 8-54923 | 2/1996 |
| JP | 8-136386 | 5/1996 |
| JP | 8-166309 | 6/1996 |
| JP | 8247076 | 9/1996 |
| JP | 2712625 | 10/1997 |
| JP | 2712701 | 10/1997 |
| JP | 7225530 | 5/1998 |
| JP | 10-232170 | 9/1998 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 00/70531 | 11/2000 |

OTHER PUBLICATIONS

"Ein Emulationssystem zur Leistungsanalyse von Feldbussystemen, Teil 1," by R. Hoyer, pp. 335–336 (1991).

"Simulatore Integrato: Controllo su bus di campo,"by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (Oct. 1992).

"PROFIBUS–Infrastrukturmassnahmen," by Tilo Pfeifer et al., pp. 416–419 (Aug. 1991).

"Simulation des Zeitverhaltens von Feldbussystemen," by O. Schnelle, pp. 440–442 (1991).

U.S. application No. 09/169,873, Eryurek et al., filed Oct. 12, 1998.

U.S. application No. 09/175,832, Eryurek et al., filed Oct. 19, 1998.

U.S. application No. 09/257,896, Eryurek et al., filed Feb. 25, 1999.

U.S. application No. 09/303,869, Eryurek et al., filed May 3, 1999.

U.S. application No. 09/335,212, Kirkpatrick et al., filed Jun. 17, 1999.

U.S. application No. 09/360,473, Eryurek et al., filed Jul. 23, 1999.

U.S. application No. 09/383,828, Eryurek et al., filed Aug. 27, 1999.

U.S. application No. 09/384,876, Eryurek et al., filed Aug. 27, 1999.

U.S. application No. 09/406,263, Kirkpatrick et al., filed Sep. 24, 1999.

U.S. application No. 09/409,098, Eryurek et al., filed Sep. 30, 1999.

U.S. application No. 09/409,114, Eryurek et al., filed Sep. 30, 1999.

U.S. application No. 09/565,604, Eruyrek et al., filed May 4, 2000.

U.S. application No. 09/576,450, Wehrs, filed May 23, 2000.

U.S. application No. 09/606,259, Eryurek, filed Jun. 29, 2000.

U.S. application No. 09/616,118, Eryurek et al., filed Jul. 14, 2000.

U.S. application No. 09/627,543, Eryurek et al., filed Jul. 28, 2000.

"Feldbusnetz für Automatisierungssysteme mit intelligenten Funktionseinheiten," by W. Kriesel et al., pp. 486–489 (1987).

"Process Measurement and Analysis," by Liptak et al., Instrument Engineers' Handbook, Third Edition, pp. 528–530, (1995).

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° C.", by M.J. de Groot et al., *CAL LAB*, Jul./Aug. 1996, pp. 38–41.

"Application of Neural Computing Paradigms for Signal Validation," by B. R. Upadhyaya et al., *Department of Nuclear Engineering*, pp. 1–18.

"Appplication of Neural Networks for Sensor Validation and Plant Monitoring," by B. Upadhyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*,1989, pp. 269–274.

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990, pp. 2–10.

"Neural Networks for Sensor Validation and Plantwide Moitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151–162.

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing Data Handling and Communications: The Case Measurement Validation", by M.P. Henry, *Department of Engineering Science, Oxford University*.

"Smart Temperature Measurement in the '90s", by T. Kerlin et al., *C&I*, (1990).

"Taking Full Advantage of Smart Transmitter Technology Now," by G. Orrison, *Control Engineering*, vol. 42, No. 1, Jan. 1995.

"Using Artificial Neural Networks to Indentify Nuclear Power Plant States," by Israel E. Alguindigue et al., pp. 1–4.

"A TCP/IP Tutorial" by, Socolofsky et al., Spider Systems Limited, Jan. 1991 pp. 1–23.

"Approval Standards for Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use in Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, pp. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.2–1992, pp. 1–93.

"Fieldbus Standard for Use in Industrial Control Systems Part 3: Data Link Service Definition", ISA–S50.Feb. 1992, Part 3, Aug. 1997, pp. 1–159.

Fieldbus Standard For Use in Industrial Control Systems Part 4: Data Link Protocol Specification, ISA–S50.2–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding FOUNDATION™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *COMMUN. STATIS.—SIMULA.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

"Advanced Engine Diagnostics Using Universal Process Modeling", by P. O'Sullivan, *Presented at the 1996 SAE Conference on Future Transportation Technology*, pp. 1–9.

Parallel, Fault–Tolerant Control and Diagnostics Systems for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339–1354, (1996).

"Survey, Applications, And Prospects of Johnson Noise Thermometry," by T. Blalock et al., *Electrical Engineering Department*, 1981 pp. 2–11.

"Noise Therometry for Industrial and Metrological Applications at KFA Julich," by H. Brixy et al., *7th International Symposium on Temperature*, 1992.

"Johnson Noise Power Themometer and its Application in Process Temperature Measurement," by T.V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1–50–6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et al., *Proceedings of the 29th Conference on Decision and Control*, 1990, pp. 3277–3282.

"A Fault–Tolerant Interface for Self–Validating Sensors," by M.P. Henry, *Colloquim*, pp. 3/1–3/2 (Nov. 1990).

"Fuzzy Logic and Artificial Neural Networks for Nuclear Power Plant Applications," by R.C. Berkan et al., *Proceeedings of the American Power Conference*.

"Fuzzy Logic and Neural Network Applications to Fault Diagnosis", by P. Frank et al., *International Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7., pp. 907–924, (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., *Department of Nuclear Engineering*, Jul. 8, 1990, pp. 1–6.

"Thermocouple Continuity Checker," IBM Technical Disclosure Bulletin, vol. 20, No. 5, p. 1954 (Oct. 1977).

"A Self–Validating Thermocouple," Janice C–Y et al., IEEE Transactions on Control Systems Technology, vol. 5, No. 2, pp. 239–53 (Mar. 1997).

*Instrument Engineer's Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System, " by Fred M. Discenzo et al., pp. 3/1–3/4 (1999).

"Process Measurement and Analysis," by Liptak et al., Instrument Engineers' Handbook, Third Edition, pp. 528–530, (1995).

\* cited by examiner

RESISTANCE BASED PROCESS CONTROL DEVICE DIAGNOSTICS

This is a Continuation-In-Part application of U.S. Ser. No. 09/138,446, filed Aug. 21, 1998 which is a Continuation-In-Part application of U.S. Ser. No. 09/016,216, filed Jan. 30, 1998 which is a Continuation-In-Part application of U.S. Ser. No. 08/744,980, filed on Nov. 7, 1996, now U.S. Pat. No. 5,828,567.

BACKGROUND OF THE INVENTION

The present invention relates to equipment of the type used in the process control industry. More specifically, the invention relates to diagnostics for process control device in which the diagnostics is a function of a resistance.

Process control devices are used to monitor process variables and control industrial processes. For example, a process control transmitter might monitor temperature and transmit such information back to a control room. Furthermore, a process controller such as a valve controller is used to control the process.

As sensors, control elements or other components, are subjected to harsh environmental conditions, the accuracy of the system tends to degrade. It is possible to compensate for this degradation by periodically recalibrating the device. Typically, this requires an operator to enter the field and perform a calibration process on-site on the device. This is both inconvenient and time consuming for the operator. Further, it is difficult to determine the condition of a device, prior to its ultimate failure.

It is also necessary for the device or their components to be periodically replaced as they age. However, it is difficult to determine precisely when such replacement is necessary. Therefore, components are typically replaced well before their failure or, in some cases, they may fail unexpectedly requiring an unscheduled system shutdown.

SUMMARY OF THE INVENTION

A device in a process control system includes an electrical element which has a resistance. self-heating circuitry coupled to the element provides a self-heating signal related to the resistance of the electrical element. Diagnostic circuitry provides an output as a function of the self-heating signal output, for example, a residual life estimate of the element or a calibration output.

DETAILED DESCRIPTION OF THE PREFERRED EMBODIMENTS

Figure 1:
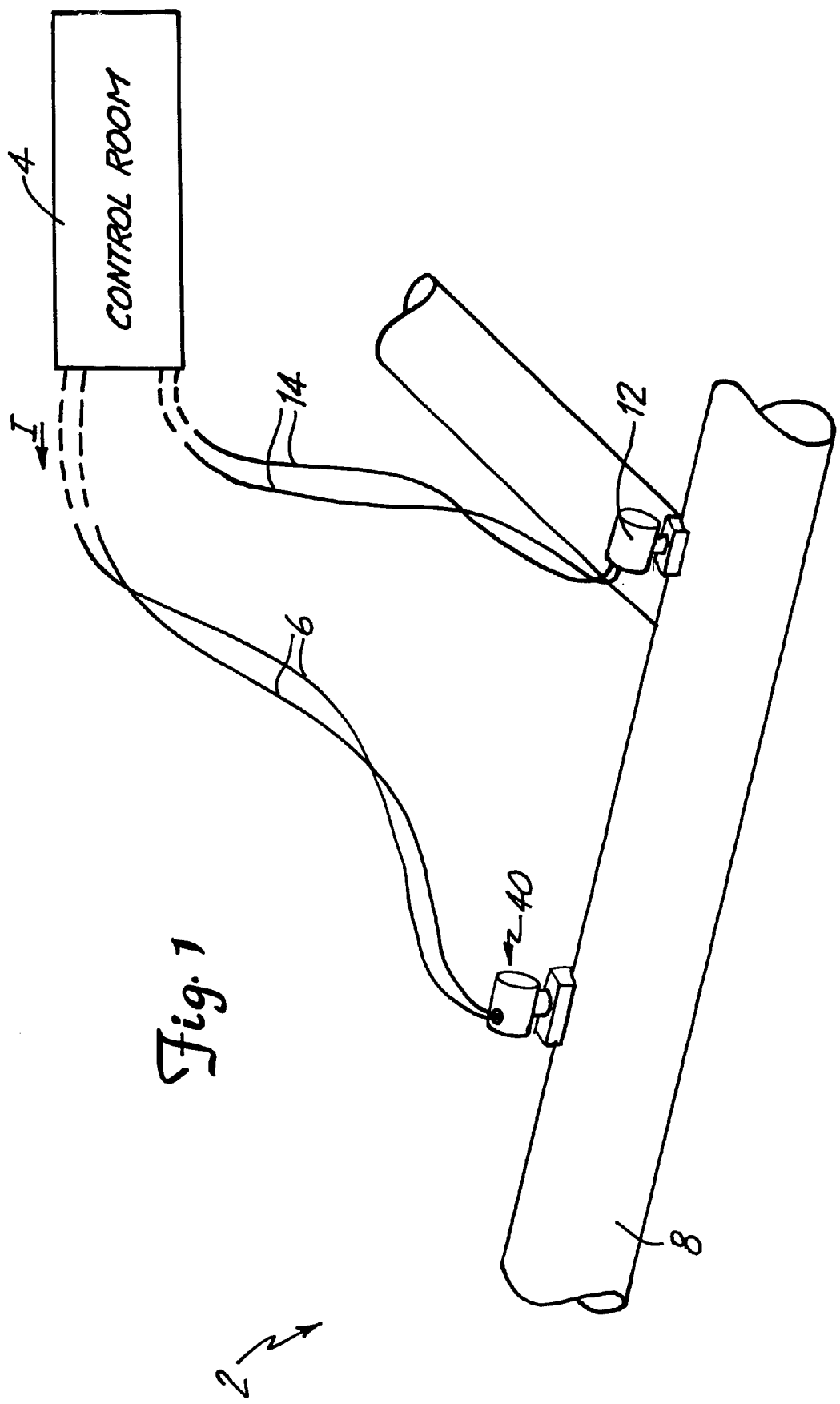
FIG. 1 shows a process control system including a transmitter in accordance with the present invention.

FIG. 1 is a diagram of process control system 2 including field mounted temperature transmitter 40 and a valve controller 12 coupled electrically to control room 4 over a two wire process control loops 6 and 14, respectively. Transmitter 40, mounted on a manifold and connected to the pipe via a manifold, monitors the process variable of process fluid (i.e., process medium or process material) in process piping 18. The present invention applies to any electrical element in a process control device. Examples of process variable sensors which include a resistance include sensors for temperature, pressure, flow, pH, turbidity, level, etc. In one embodiment, transmitter 40 is a temperature transmitter which transmits temperature information to control room 4 over loop 6 by controlling the current flowing through loop 6. For example, the current flowing through loop 6 may be controlled between 4 and 20 mA and properly calibrated to indicate temperature. Additionally or in the alternative, transmitters in accordance with the invention may transmit digital information related to temperature over loop 6 to control room 4 such as in a HART® or an all digital protocol such as Fieldbus. Transmitter 40 includes circuitry described herein in more detail which provides advanced diagnostics related to sensor operation.

One aspect of the present invention includes a recognition of a close correlation, in some cases a linear relationship, of the self-heating index (SHI) to RTD Resistance Temperature Dependent sensor calibration constants (i.e., Ro and alpha). Therefore, if the appropriate calibration constants, such as Ro and alpha, can be determined from the measured SHI, the lifetime of the RTD sensor can be estimated. Furthermore, the sensor output can be corrected in real-time as a function of the amount of degradation (e.g., the difference between a preselected value of the SH index and the true current value of the SH index). This provides an autocorrection to the transmitter output.

One aspect of the invention includes a new technique for determining the SH index of a resistive element in a transmitter. Typically, prior art self-heating index measurement was performed by monitoring temperature change in the element due to an applied current. However, in a process control device it is impractical to perform such a measurement due to power limitations and the necessity of a separate temperature measurement. The present invention includes defining the self-heating index as the change in resistance of an electrical element for a given change in the power input to the element. This technique is preferable for a process control device because it does not require the resistive element to be calibrated to temperature. Furthermore, the technique does not require the element to be removed from the process such that real-time data can be collected without the trouble arid cost of interrupting the process. The self-heating index can be calculated in a process control device by applying two different input currents, for example, 5 mA and 15 mA to the electrical element. The resulting voltages across the element is measured and the resistance of the element is calculated at the two different currents using, for example, the equation R=V/I. The power applied to the element is determined at the two different currents as P=I·V. The self-heating index is calculated in accordance with equation 1:

$$SHI = \frac{R_2 - R_1}{P_2 - P_1} \qquad \text{Eq. 1}$$

The invention can be practiced in any of a number of places in a process system control system. In particular, the present invention, as realized in software and a microprocessor, can reside in a central controller or a final control element such as a valve, motor or switch. Furthermore, modern digital protocols such as Fieldbus, Profibus and others allow for the software which practices the present invention to be communicated between elements in a process control system. As an example, a transmitter may send its digital representation of a sensed process variable directly to the microprocessor of, perhaps, a valve that will respond according to the value of the sensed process variable.

Figure 2:
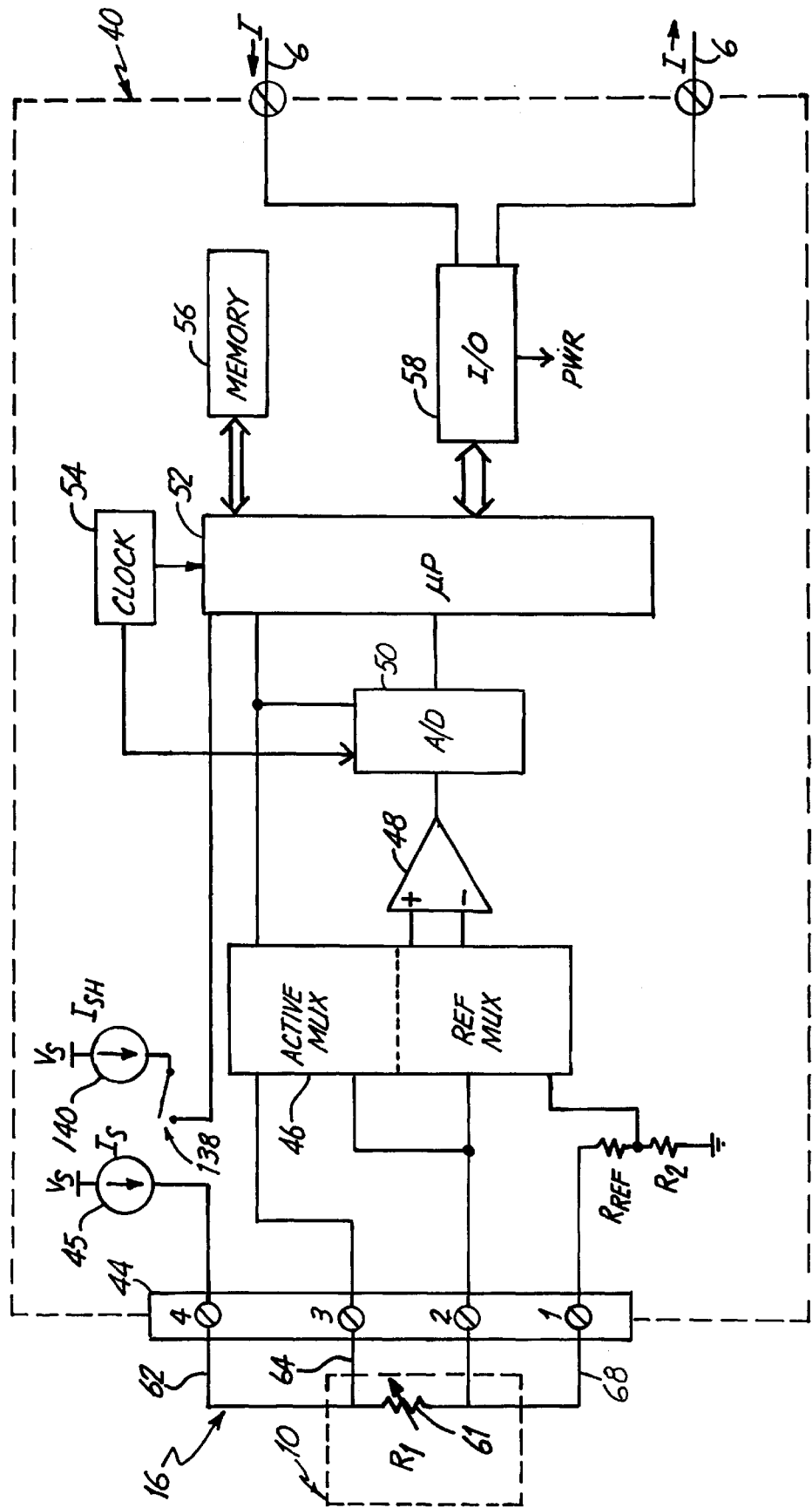
FIG. 2 is a block diagram of a transmitter of the present invention.

FIG. 2 is a simplified block diagram of the invention implemented in a process control device shown as temperature transmitter 40 connected to RTD temperature sensor 10. Transmitter 40 includes terminal block 44, current source 45, multiplexer 46, differential amplifier 48, high accuracy A/D converter 50, microprocessor 52, clock circuit 54, memory 56 and input-output circuit 58.

Terminal block 44 includes terminals 1 through 4 for coupling to, for example, RTD temperature sensor 10. Sensor 10 can be either internal or external to transmitter 40. Sensor 1C includes RTD sensor element 61 having a resistance $R_1$ which varies with changes in the process temperature. Leads 16 include four element leads 62, 64, 66 and 68. Lead 62 is connected between sensor element 61 and terminal 4, lead 64 is connected between sensor element 61 and terminal 3, lead 66 is connected between sensor element 61 and terminal 2, and lead 68 is connected between sensor element 61 and terminal 1.

Current source 45 is connected to terminal block 44 and supplies a measurement current $I_s$ through terminal 4, sensor element 61, terminal 1, reference resistance $R_{REF}$, pull-down resistance $R_2$ and ground terminal 72. Sensor element 61 develops a voltage drop across terminals 2 and 3 which is a function of the resistance $R_1$ and thug the temperature of sensor element 61. Reference resistor $R_{REF}$ is connected between terminal 1 and pull-down resistor $R_2$.

Multiplexer 46 is divided into two sections, an active multiplexer having an output connected to the non-inverting input of differential amplifier 48 and a reference multiplexer having an output connected to the inverting input of differential amplifier 48. Microprocessor 52 controls multiplexer 46 to multiplex appropriate sets of analog signals, including signals from terminals 1 through 3, to the non-inverting and inverting inputs of differential amplifier 48. Differential amplifier 48 has an output connected to A/D converter 50. In one embodiment, A/D converter 50 has an accuracy of 17 bits and a conversion rate of 14 samples/second. A/D converter 50 converts the voltage at the output of differential amplifier 48 into a digital value and provides that value to microprocessor 52 for analysis or for communication over process control loop 6 through input-output circuit 58.

Input-output circuit 58, in a preferred embodiment, includes a HART® communication section, a FIELDBUS communication section and a 4–20 mA analog loop section for analog or bi-directional digital communicating over loop 6 according to a selected protocol in a known manner. Other protocols can also be used, for example, a four-wire configuration may be employed in which power is received from a separate source. Loop 6 also provides power to the various components of transmitter 40 through input-output circuit 58. Preferably, transmitter 40 is wholly (completely) powered by the two-wire loop 6.

Memory 56 stores instructions and information for microprocessor 52, which operates at a speed determined by clock circuit 54. Clock circuit 54 includes a real time clock and a precision high speed clock, which are also used to sequence the operation of A/D converter 50. Microprocessor 52 performs several functions, including control of multiplexer 46 and A/D converter 50, control of communications over loop 6, temperature compensation, storage of transmitter configuration parameters and performing sensor diagnostics.

Microprocessor 52 employs the following equation to compute the temperature of RTD sensor element 61:

$$R_1 = \frac{V_{R1}}{V_{RREF}}(R_{REFNOM}) \qquad \text{Eq. 2}$$

where:

$R_1$=resistance of RTD sensor element 61;

$V_{R1}$=voltage drop across the RTD sensor element 61;

$V_{RREF}$=voltage drop across resistance $R_{REF}$; and $R_{REFNOM}$=nominal resistance of the reference resistance $R_{REF}$ in Ohms, and/or stored in memory 56.

Microprocessor 52 measures the voltage drop $V_{R1}$ across RTD sensor element 61 between terminals 2 and 3, and the voltage drop ($V_{RREF}$) across reference resistance $R_{REF}$ with multiplexer 46. In a four-wire resistance measurement such as the one shown in FIG. 2, the voltage drop across the connections to terminals 2 and 3 is largely eliminated, since substantially all of the current $I_S$ flows between terminals 1 and 4, and has little impact on the accuracy of the measurement. Microprocessor 52 converts the measured resistance $R_1$ into temperature units with a look-up table or suitable equations stored in memory 30. For example, one such equation is the Callender-Van Dusen equation which is:

$$R(t) = R_0\left\{1 + \alpha\left(t - \delta\left(\frac{t}{100}\right)\left(\frac{t}{100} - 1\right) - \beta\left(\frac{t}{100} - 1\right)\left(\frac{t}{100}\right)^3\right)\right\} \qquad \text{Eq. 3}$$

Where:

R(t)=Resistance at temperature t, in Ohms.

$R_0$=Resistance at temperature 0 deg. C, Ohm.

t=Temperature, deg C.

α, δ, β=Calibration constants.

β=0 for t>0 deg C.

However, both stored lookup tables or the equation 2 must be properly calibrated for a particular RTD temperature sensor. Further, such calibration tends to change over time as the Ro and alpha (α) for the sensor drifts. Calibrating an RTD requires an accurate thermometer reference to obtain a number of correct temperature values in order to accurately determine the constants α, $R_0$ and δ. Equation 3 and transmitter calibration are discussed in PRT Handbook Bulletin 1042, dated Feb. 1985, published by Rosemount arid incorporated by reference.

Figure 3:
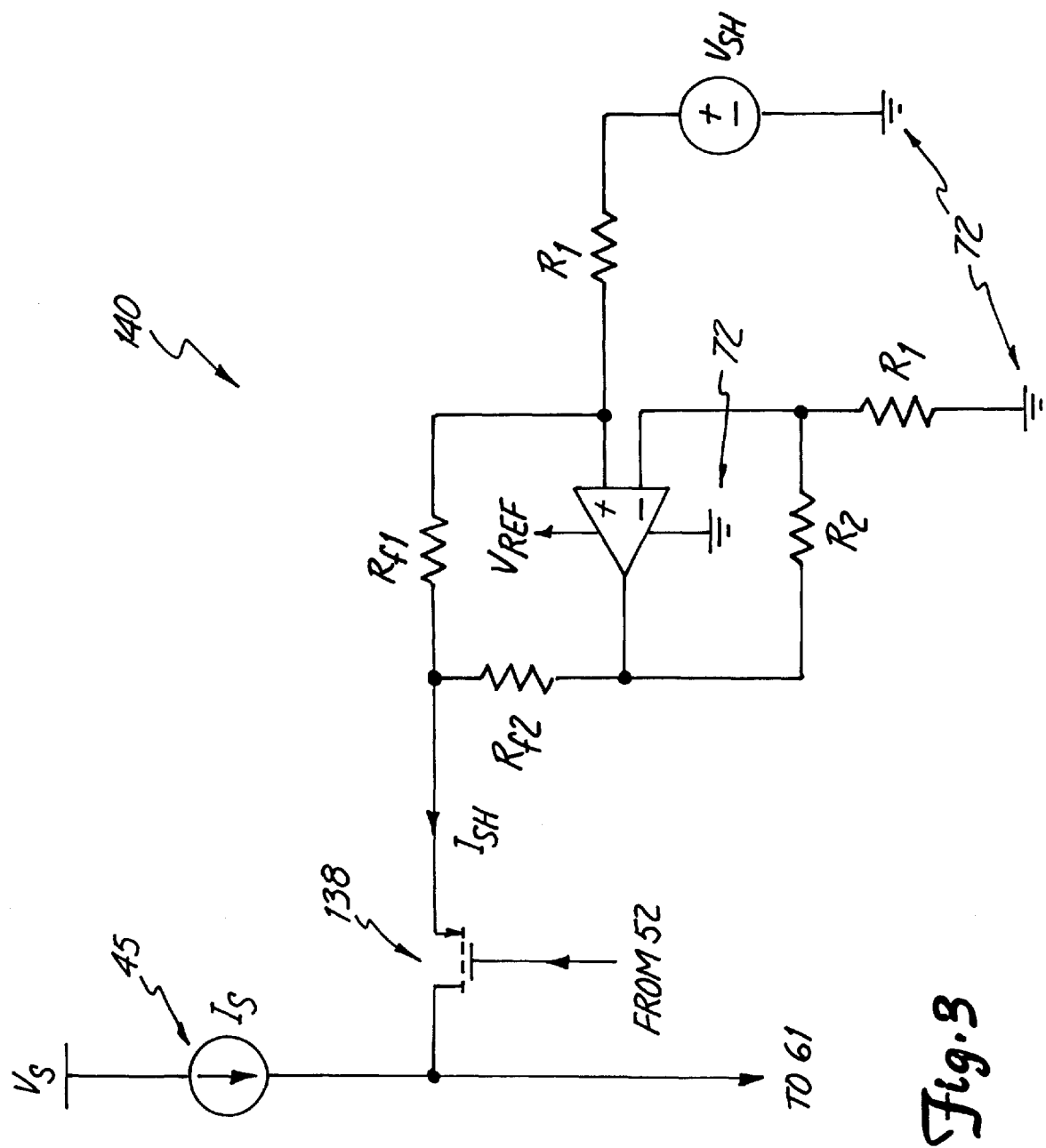
FIG. 3 is a simplified schematic in accordance with an embodiment of the present invention.

The SH index is calculated when microprocessor 52 actuates switch 138 to couple current source 140 to sensor 61. $P_1$ and $R_1$ of equation 1 are calculated with current $I_s$ from source 45 flowing through sensor 61. Microprocessor 52 determines $P_2$ and $R_2$ due to current $I_{SH}$ from source 140. The SH index is calculated using equation 1. A simplified schematic of the self-heating circuitry is shown in FIG. 3. The self-heating power supply ($V_{SH}$) 86 is coupled to the input of V-I converter 88 that outputs the self-heating current ($I_{SH}$) to sensor element 61 of FIG. 2 through analog switch 138. If $V_{SH}$ is not supplied by an external power source, then $I_{SH}$ is limited to the current I in loop 6 in FIG. 2, less any current required to operate circuitry in transmitter 40.

Microprocessor 52 provides an element diagnostics and performs diagnostics related to operation of transmitter 40 using the SH index. The following describes a number of embodiments for realizing the diagnostic circuitry in transmitter 40. Such diagnostics include determining sensor health, performing a residual lifetime estimate may be representative of an impending sensor failure, or performing an autocorrection to the temperature measurement.

Another aspect of the present invention includes the use of the self-heating index to correct the temperature measurement to reduce errors due to drift in alpha ($\alpha$) and $R_0$. As the RTD sensor ages, the constant alpha ($\alpha$) and $R_0$ (given in equation 2) for the sensor changes, thereby causing inaccuracies in the temperature measurements. It has been discovered that there is a substantially linear relationship between the SH index and error in the temperature measurement caused by drift in alpha ($\alpha$) and $R_0$. The temperature can be corrected using the equation:

$$T_{corrected} = T_{measured} \cdot \Delta SHI \cdot K \qquad \text{Eq. 4}$$

where:

$T_{measured}$ is the measured temperature;

K is a constant of proportionality;

$\Delta SHI$ is the change in the self-heating index; and $T_{corrected}$ is the autocorrected temperature.

Figure 4:
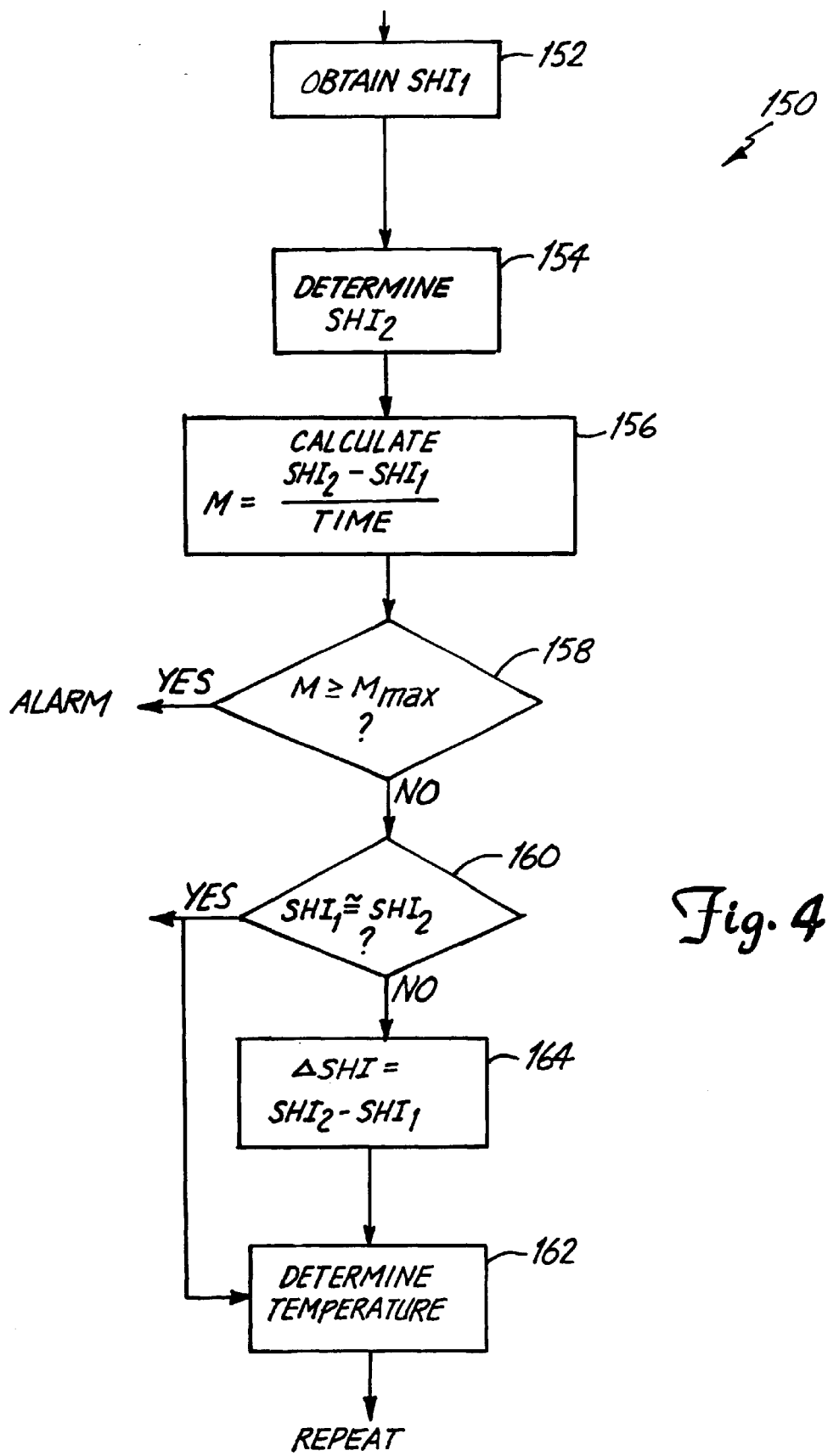
FIG. 4 is a simplified flow chart of the diagnostic function in accordance with one embodiment of the invention.

FIG. 4 is a flow chart 150 illustrating the present invention as it relates to autocorrection the temperature output as a function of the SH index. Diagram 150 shows operations which would typically be performed by microprocessor 52 in FIG. 2. At block 152, the previous value of the self-heating index ($SHI_1$) is obtained, for example, from memory 56. This value may have been stored in memory during manufacture, previously generated by microprocessor 52 or determined and stored when the transmitter was commissioned or even at a preselected time during operation of transmitter 40. At block 154 the current value of the SH index ($SHI_2$) is determined by microprocessor 52. If the rate of change, m is greater than or equal to a maximum allowable rate of change ($m_{MAX}$), decision block 158 provides an alarm output. In general, a value representative of the difference between $SHI_2$ and $SHI_1$ is assessed at block 156. A preferred method for this differencing function is to calculate the slope over time of the two SHI values. However, other methods of assessing the amount of difference, some as simple as comparing $SHI_2$ to a threshold value, can be implemented without block 156. The output may be transmitted, for example, over loop 6 to indicate that the sensor has degradated to such an extent that failure is imminent and replacement is necessary. Other types of diagnostics may also be performed such as those set forth in the parent application U.S. Ser. No. 08/744,980, filed Nov. 7, 1996. The value of $m_{MAX}$ is stored in memory 56 and may be user configurable based upon the accuracy desired for a particular process. The alarming function at block 158 is optional, but preferred to the present invention.

If the alarm condition does not exist, control passes to decision block 160 in which the measured self-heating index ($SHI_2$) is compared with the stored self-heating index ($SHI_1$). If they are approximately the same, control is passed to block 162 and the temperature is determined. If, on the other hand, there is a difference between the two values, a new value for the $\Delta SHI$ in equation 4 is calculated by microprocessor 52 at block 164. Further, other more complex curve fitting techniques can be used to correlate SHI with sensor calibration. Control is passed to block 162 and the new value for $\Delta SHI$ in equation 4 is used in determining temperature. The new value for $\Delta SHI$ is stored in memory to replace the previous value.

The various functions set forth in FIG. 4 may be performed remotely, in a process control device, in the control room, in a computer located off-site or in a combination of these locations. Generally, the invention can be practiced in any of a number of places in a process system control system. For example, the present invention as realized in software and a microprocessor, can reside in a central controller or even a final control element such as a valve, motor or switch as shown in FIG. 1. Furthermore, modern digital protocols such as Fieldbus, Profibus and others allow for the software which practices the present invention to be communicated between devices in a process control system, and also provide for process variables to be sensed in one transmitter and used by the software in a valve or another transmitter.

One embodiment of diagnostic circuitry in the present invention uses empirical models or polynomial curve-fitting which are functions of SH index. For example, a polynomial which is a function of the SH index is used for computing the residual lifetime estimate. The constants and/or the equations may be sent over the two wire loop to transmitter 40. Another diagnostic circuit is implemented with a multi-layer neural network. Although a number of training algorithms can be used to develop a neural network model for different goals, one embodiment includes the known Back-propagation Network (BPN) to develop neural network modules which will capture the nonlinear relationship among a set of input and outputs(s).

Another embodiment of diagnostic circuitry 52 uses a set of if—then rules to reach a conclusion on the status of the temperature sensor RTD 61. The SH index is monitored and its present value is compared to upper and lower boundaries. The upper and lower boundaries are empirically set by testing of many RTD sensors. A decision is made based upon the comparison.

In another aspect of the invention, the rate of change (ROC) of the SH index is correlated with life expectancy of sensor 61. The ROC of the SH index is provided to the diagnostic circuitry implemented in microprocessor 52 which provides an output indicative of expected life, including a warning when the expected remaining sensor life has dropped below a minimum value.

Figure 5:
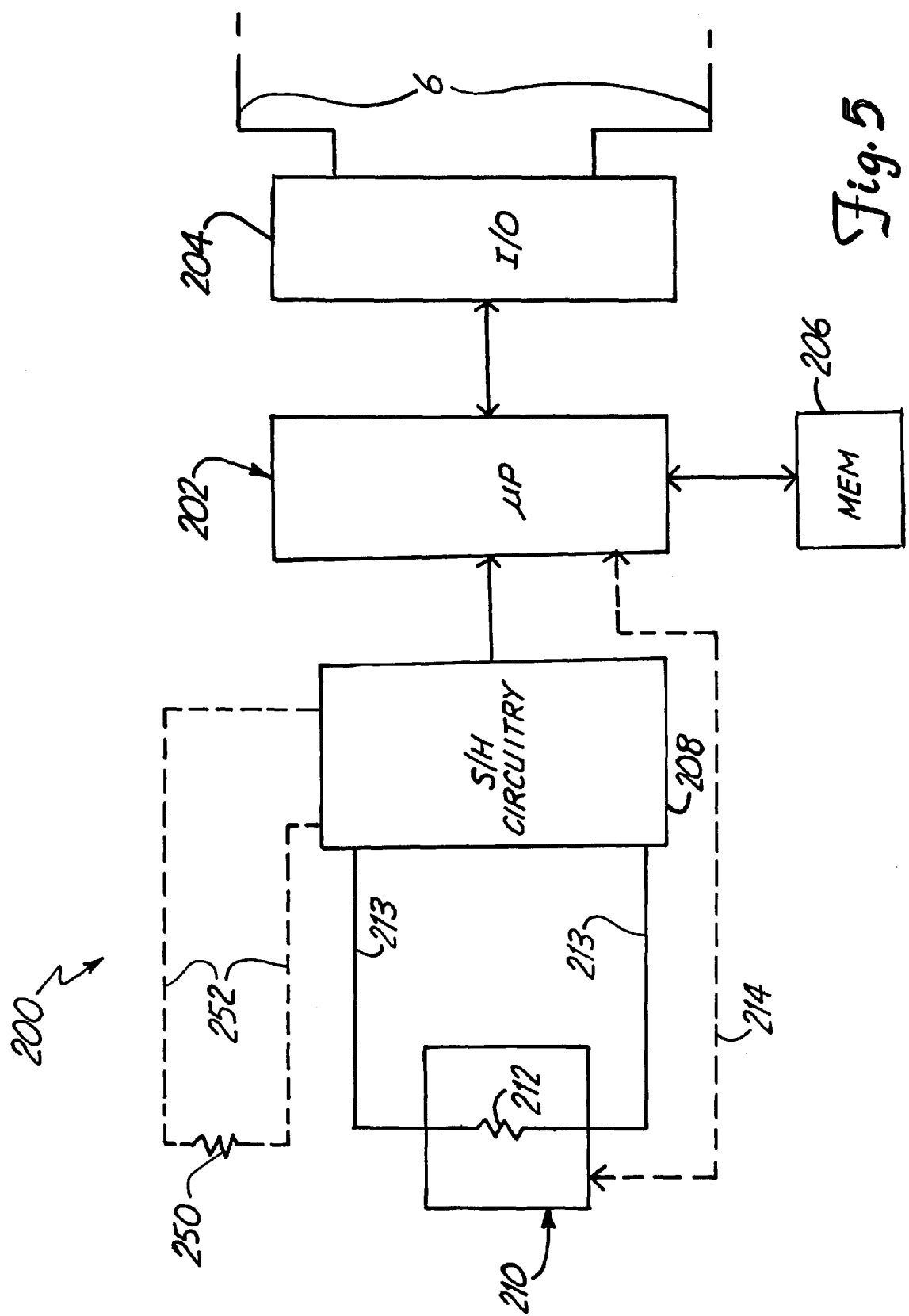
FIG. 5 is a simplified block diagram of a process control device in accordance with the invention.

FIG. 5 is a simplified block diagram of a process control device 200 in accordance with more general aspects of the present invention coupled to process control loop 6. Device 200 may be any type of process control device with an electrical element with a measurable resistance. Transmitter 40 of FIG. 1 is one example of instrument 200. Device 200 includes microprocessor 202 coupled to loop 6 through I/O circuitry 204 which provides a device output and to a memory 206. A self-heater 208 couples to a process control element 210 and provides a self-heating signal to microprocessor 202. Process control element 210 is an electrical element which includes a resistance element 212 having an electrical resistance for which a self-heating value is determined by self-heater 208 using the techniques in accordance with the invention. Connection 213 to resistance 212 can be through a four point Kelvin connection to obtain more accurate measurements. Dashed line 214 is shown between element 210 and microprocessor 202 to represent any connection or exchange of signals between element 210 and microprocessor 202. For example, if element 210 is a process variable sensor, connection 214 provides process variable data to microprocessor 202. Similarly, if element 210 is a process control element, connection 214 provides a control input from microprocessor 202 to element 210. One aspect of the invention includes the use of self-heating diagnostic techniques to perform diagnostics on any type of process control element. For example, as used herein, a "process control element" includes any element in a process (a transmitter, RTD, thermocouples, strain gauge, pick up or drive coil, etc.) which has a resistance. Process control devices include devices for measuring flow (coriolis, magnetic, vortex, differential pressure, etc.) pressure, level, pH, turbidity temperature, etc. as well as control devices such as valve actuators, solenoids, etc. Some examples of process control elements include RTD 61 described above, as well as thermocouples, electrical coils, wiring which couples to sensors terminations, terminal blocks, strain gauges or other types of sensors, actuators or other electrical components.

In another aspect, if two resistance elements are being used to measure the same process temperature, the SHI for both elements can be more accurately measured. Specifically, one resistance element can be used to monitor the change in the process temperature while the other resistance element is subjected to the self-heating current ($I_{SH}$). For example, if the process temperature is changing during a self-heating measurement, the SHI obtained using a single resistance element can be inaccurate due to a temperature change in the process. In some situations, the total change in resistance ($\Delta R$) is caused by the resistance change due to the application of the self-heating current ($R_C$) and the resistance change due to the change in the process temperature ($\Delta R_P$):

$$\Delta R = \Delta R_P + R_C \quad\quad\quad \text{Eq. 5}$$

Furthermore, from the numerator in equation 1, $\Delta R = R_2 - R_1$ where $R_1 = R_{P1}$ (the resistance value of the process temperature at time $T_1$) and $R_2 = R_{P2} + R_C$ (the resistance value of the process temperature at time $T_2$ and the resistance value of the temperature change due to the self-heating current). This gives the equation:

$$\Delta R = R_{P2} + R_C - R_{P1} = \Delta R_P + R_C \quad\quad\quad \text{Eq. 6}$$

Ideally, if there is no change in process temperature from time $T_1$ to time $T_2$, then $R_{P1} = R_{P2}$ and $\Delta R = R_C$. However, if the process temperature has changed and $R_{P1}$ does not equal $R_{P2}$, then a second temperature measurement can be applied to account for this change in process temperature.

Figure 6:
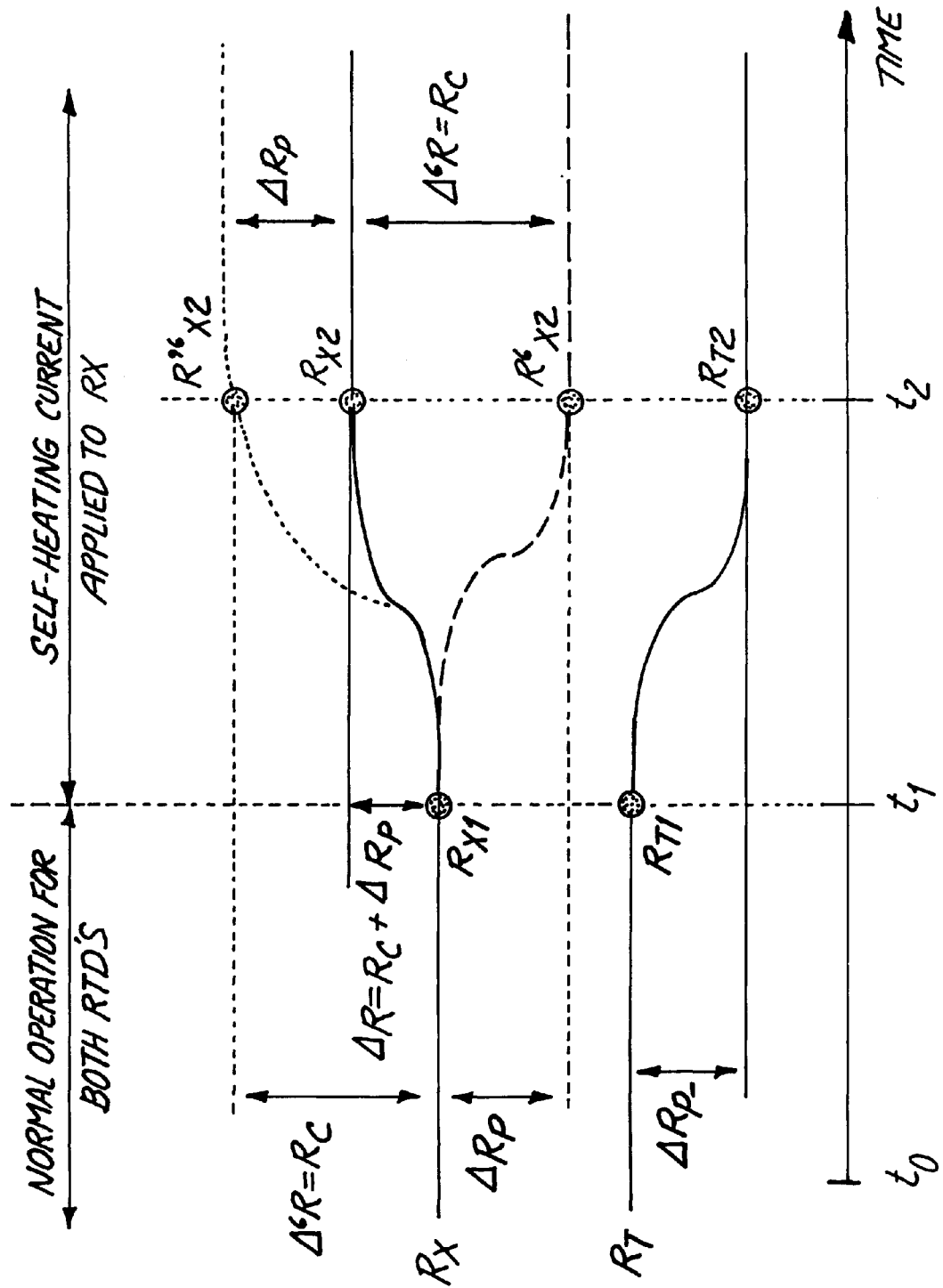
FIG. 6 is a graph of resistance versus time for two electrical elements which have resistances which change with temperature.

FIG. 5 shows a second or redundant resistance element 250 which can comprise any of the electrical components which has a resistance discussed herein or any type of sensor which can be used to measure the same process temperature as resistance element 212. For example, element 250 can comprise of an RTD or a PRT. If a change in process temperature occurs during the self-heating process, an error in the SHI measurement could be introduced. To eliminate this error, one of the elements in FIG. 5 (250 or 212) can be used to sense the change in the process temperature while self-heating current is being applied to the other element. Both elements 250 and 212 are coupled to self-heating circuitry 208 through a Kelvin connection for improved accuracy. In the following example, element 212 comprises an RTD identified as $R_X$ and element 250 comprises an RTD identified as $R_T$ (note that $R_X$ and $R_T$ could be assigned to either element). FIG. 6 is a graph showing the resistances $R_X$ and $R_T$ versus time during normal operation and during a self-heating measurement. The self-heating measurement begins at time $t_1$. Further, as illustrated by the graph of the resistance $R_T$, there is a resistance change ($\Delta R_P$) due to a temperature change during the time period between $t_1$ and $t_2$. This causes the overall change in $R_X$ ($\Delta R$) to be offset by the change in resistance, $\Delta R_P$. The linear temperature formulas for $R_X$ and $R_T$ are:

$$R_X(T) = R_{OX}(1 + \alpha_X T) \quad\quad\quad \text{Eq. 7}$$

$$R_T(T) = R_{OT}(1 + \alpha_T T) \quad\quad\quad \text{Eq. 8}$$

where $R_{OX}$ and $R_{OT}$ is the resistance at temperature zero deg C in ohms, and $\alpha_X$ and $\alpha_T$ are calibration constants for elements 212 and 250, respectively. Further, the temperature T is the same for both equation 7 and equation 8. As $R_{OX}$, $R_{OT}$, $\alpha_X$ and $\alpha_T$ are known, $R_T$ can be measured and the value of $R_X$ can be calculated if no self-heating current is applied using equation 9:

$$R_X(R_T) = R_{OX}\left[1 + \alpha_X\left[\frac{\left(\frac{R_T}{T_{OT}} - 1\right)}{\alpha_T}\right]\right] \quad\quad\quad \text{Eq. 9}$$

For time $t = t_2$ where $R_X(R_{T2}) = R'_{X2}$ as shown in FIG. 6. By using the second resistive element ($R_T$) as a reference, it is possible to accurately calculate the value of self-heating index.

Referring to FIG. 6 $\Delta R = R_{X2} - R_{X1} = R_C + \Delta R_P$, where $R_{X2}$ and $R_{X1}$ are the actual measured resistance values of $R_X$ (212) at times $t_2$ and $t_1$, respectively. $\Delta R$ can be modified by subtracting out the portion of $\Delta R$ due to process temperature change ($\Delta R_P$), which yields Equation 10:

$$\Delta' R_C = (R_{X2} - R_{X1}) - \Delta R_P \quad\quad\quad \text{Eq. 10}$$

$\Delta R_P$ is calculated by subtracting the value of $R'_{X2}$ (calculated from Eq. 9) from the measured value of $R_X$ at time $t = t_1$ ($R_{X1}$):

$$\Delta R_P = R'_{X2} - R_{X1} \quad\quad\quad \text{Eq. 11}$$

Next, substitute Equation 11 into Equation 10

$$\Delta' R = (R_{X2} - R_{X1}) - (R'_{X2} - R_{X1}) \quad\quad\quad \text{Eq. 12}$$

and collect terms to produce the following expression for $\Delta' R$:

$$\Delta' R = R_{X2} - R'_{X2} = R_C \quad\quad\quad \text{Eq. 13}$$

as shown in FIG. 6.

Alternatively, Equation 13 can be written as $\Delta' R = R''_{X2} - R_{X1} = R_C$, where $R''_{X2}$ is the theoretical value of $R_{X2}$ if there was no process change during self-heating ($\Delta R_P = 0$).

Turning back to equation 1, $\Delta \text{power} = P_2 - P_1$. As power is $I^2 R$, $\Delta P = I_2^2 R_2 - I_1^2 R_1$. This can be used in the example shown in FIG. 5 to obtain a modified version of $\Delta P$, $\Delta' P$:

$$\Delta' P = I_2^2 R''_{X2} - I_1^2 R_{X1} \quad\quad\quad \text{Eq. 14}$$

Using the modified $\Delta P$, a modified self-heating index, SHI can be calculated as:

$$mSHI = \frac{\Delta Ohms}{\Delta Power} = \frac{R''_{X2} - R_{X1}}{I_2^2 R''_{X2} - I_1^2 R_{X1}} \quad\quad\quad \text{Eq. 15}$$

These particular equations and implantation are simply one technique for using a second temperature measurement to obtain a more accurate self-heating measurement.

Thus, the present invention can detect various types of failures in process device including corrosion of an electrical component. For example, in a wire, termination, coil, RTD, thermocouple, electrical trace on a printed circuit board or other electrical component which corrodes over time, there is a corresponding reduction in area which causes an increase in resistance. The present invention can detect such degradation prior to the ultimate failure of the device. Electrical components may degrade due to multiple uses which could also lead to eventual fatigue failure. The self-heating techniques of the present invention can detect such fatigue. Further, a loose termination such as occurs with a "cold" solder joint can be detected as the termination degrades.

Examples of various failures which may be detected using the present invention include a break in a coil winding, a termination or poor solder joint, a damaged trace on a circuit board, a poor wire wrap termination, a error in soldering, a poor connector damaged to a wire or component due to handling, damage to a wire component due to temperature cycling. Referring back to FIG. 4, such a failure may be detected, for example, at block 158 in which the change in self-heating index (ΔSHI) may be compared with a threshold and used to indicate a failure mode. In another aspect of the invention, the diagnostic output is used to compensate for the degradation in the electrical element. For example, the output from a sensor may be compensated as well as the input signal provided to a control element.

Although the present invention has been described with reference to preferred embodiments, workers skilled in the art will recognize that changes may be made in form and detail without departing from the spirit and scope of the invention.

What is claimed is:

1. A process control device in a process control system, comprising:
    an electrical element having an electrical resistance;
    a device output adapted to couple the device to a process control loop;
    an ambient temperature sensor configured to sense an ambient temperature which affects the electrical resistance of the electrical element;
    an electrical element self-heater coupled to the electrical element configured to provide a self-heating signal related to a self-heating index of the electrical element due to the electrical resistance and as a function of the sensed ambient temperature, the sensed ambient temperature correcting for errors in the measurement of the self-heating index;
    element diagnostics coupled to the self-heater responsively providing a diagnostic output related to health of the electrical element as a function of the self-heating signal.

2. The device of claim 1 including a memory storing at least one value related to an expected self-heating signal.

3. The device of claim 1 wherein the diagnostics comprises a neural network.

4. The device of claim 1 wherein the diagnostics comprises fuzzy logic.

5. The device of claim 1 wherein the diagnostics comprises regression models.

6. The device of claim 1 wherein the diagnostic output is related to a residual lifetime estimate for the electrical element.

7. The device of claim 6 wherein the diagnostics determines the residual lifetime estimate as a function of rate of change (ROC) of the self-heating signal.

8. The device of claim 1 wherein the element diagnostics includes a current source and voltage measurement circuitry.

9. The device of claim 1 wherein the self-heating diagnostic determines the SH index as a function of a change in resistance of the electrical element in response to a change in power applied to the electrical element.

10. The device of claim 8 wherein the SH index is calculated as $(R_2-R_1)/(P_2-P_1)$ and as a function of the measured process temperature.

11. The device of claim 1 wherein the device output is calibrated as a function of the calculated self-heating index value.

12. The device of claim 1 wherein the electrical element comprises a strain gauge.

13. The device of claim 1 wherein the electrical element comprises a control element.

14. The device of claim 1 wherein the electrical element comprises a sense element.

15. The device of claim 1 wherein the electrical element comprises a thermocouple.

16. The device of claim 1 wherein the electrical element comprises a coil.

17. The device of claim 1 wherein the electrical element temperature sensor comprises an RTD (Resistance Temperature Dependent) sensor.

18. The device of claim 1 wherein the sensed ambient temperature compensates for changes in the electrical resistance of the electrical element due to changes in the sensed ambient temperature during application of the self-heating current.

19. A method for diagnosing an electrical element in a process control device, comprising:
    sensing an ambient temperature which affects a resistance of the electrical element;
    obtaining a self-heating index (SHI) for an electrical element of the device, the sensed ambient temperature correcting for errors in the measurement of the self-heating index;
    providing an electrical element diagnostic output as a function of the SHI.

20. The method of claim 19 wherein obtaining the SHI comprises measuring change in resistance of the electrical element in response to a change in power applied to the electrical element.

21. The method of claim 20 wherein the self-heating index is calculated as $(R_2-R_1)/(P_2-P_1)$ as a function of the sensed process temperature.

22. The method of claim 19 including estimating residual life of the electrical element based upon a rate of change of the SHI.

23. The method of claim 22 wherein obtaining the SHI includes sequentially injecting at least two different current levels into the electrical element and measuring the resultant voltage drop across the electrical element.

24. The method of claim 19 including determining life expectancy of the electrical element as a function of the diagnostic output.

25. The method of claim 19 including calibrating the electrical element as a function of the SHI.

26. A device for use in a process control system, comprising:
    a loop I/O configured to coupled to a process control loop;
    an electrical element having a resistance;
    a current source coupled to the electrical element to inject a current into the electrical element;
    a voltage sensor coupled to the electrical element having an output related to voltage drop across the electrical element;
    an ambient temperature sensor configured to sense a temperature which affects the resistance of the electrical element; and
    element diagnostics having a self-heating (SH) index output as a function of injected current and the voltage drop across the electrical element due to the resistance, the SH output corrected for errors as a function of the sensed ambient temperature.

27. The device of claim 26 wherein the diagnostics provides a life expectancy output of the electrical element as a function of the SH index.

28. The device of claim 26 including measurement an output related to a process variable as a function of an output from the electrical element and the SH index.

29. The device of claim 26 wherein the SH index is determined as a function of a change in resistance of the electrical element in response to a change in power applied to the electrical element.

30. The device of claim 26 wherein the SH index is calculated as $(R_2-R_1)/(P_2-P_1)$.

31. The device of claim 26 wherein the electrical element comprises a strain gauge.

32. The device of claim 26 wherein the electrical element comprises a control element.

33. The device of claim 26 wherein the electrical element comprises a sense element.

34. The device of claim 26 wherein the electrical element comprises a coil.

35. The device of claim 26 wherein the electrical element comprises a thermocouple.

36. The device of claim 26 wherein the electrical element comprises an RTD (Resistance Temperature Dependent) sensor.

37. The device of claim 26 wherein the sensed process temperature compensates for changes in the electrical resistance of the electrical element due to changes in the sensed process temperature during application of the self-heating current.

* * * * *

UNITED STATES PATENT AND TRADEMARK OFFICE
CERTIFICATE OF CORRECTION

PATENT NO. : 6,434,504 B1
DATED : August 13, 2002
INVENTOR(S) : Evren Eryurek et al.

It is certified that error appears in the above-identified patent and that said Letters Patent is hereby corrected as shown below:

Title page,
Item [56], References Cited, OTHER PUBLICATIONS, change:
""PROFIBUS-Infrastrukturmassnahmen," by Tilo Pfeifer et al., pp. 416-419 (Aug. 1991)." to
-- "PROFIBUS-Infrastrukturmaβnahmen," by Tilo Pfeifer et al., pp. 416-419 (Aug. 1991). --
Change: ""Appplication of Neural Networks for Sensor Validation and Plant Monitoring," by B. Upadhyaya et al., Nuclear Technology, Vol. 97, No. 2, Feb. 1992 pgs. 170-176." to
-- "Application of Neural Networks for Sensor Validation and Plant Monitoring," by B. Upadhyaya et al., Nuclear Technology, Vol. 97, No. 2, Feb. 1992 pgs. 170-176. --
Change: ""Fieldbus Standard for Use in Industrial Control Systems Part 3: Data Link Service Definition", ISA-S50.Feb. 1992, Part 3, August 1997, pp. 1-159." to
-- "Fieldbus Standard for Use in Industrial Control Systems Part 3: Data Link Service Definition", ISA-S50.Feb. 1997, Part 3, August 1997, pp. 1-159. --

Column 8,
Equation 9, change:

"$$R_X(R_T) = R_{OX}\left[1 + \alpha_X \left[\frac{\left(\frac{R_T}{T_{OT}} - 1\right)}{\alpha_T}\right]\right]2 \quad \text{Eq. 9}"$$

to $$R_X(R_T) = R_{OX}\left[1 + \alpha_X \left[\frac{\left(\frac{R_T}{R_{OT}} - 1\right)}{\alpha_T}\right]\right]2 \quad \text{Eq. 9} --$$

UNITED STATES PATENT AND TRADEMARK OFFICE
CERTIFICATE OF CORRECTION

PATENT NO.   : 6,434,504 B1
DATED        : August 13, 2002
INVENTOR(S)  : Evren Eryurek et al.

It is certified that error appears in the above-identified patent and that said Letters Patent is hereby corrected as shown below:

<u>Column 8, cont'd,</u>
Equation 10, change:

" $\Delta' R_C = (R_{X2} - R_{X1}) - \Delta R_P$ 4 "      Eq. 10"

to

-- $\Delta' R = R_C = (R_{X2} - R_{X1}) - \Delta R_P$ 4      Eq. 10 --

Signed and Sealed this

First Day of April, 2003

JAMES E. ROGAN
*Director of the United States Patent and Trademark Office*